United States Patent
Neil et al.

(10) Patent No.: US 10,814,871 B2
(45) Date of Patent: Oct. 27, 2020

(54) COMPUTING SYSTEM FOR ASSIGNING MANEUVER LABELS TO AUTONOMOUS VEHICLE SENSOR DATA

(71) Applicant: GM Cruise Holdings LLC, San Francisco, CA (US)

(72) Inventors: Cody Neil, San Francisco, CA (US); Samuel Abrahams, San Francisco, CA (US); Batyr Nurbekov, San Francisco, CA (US); Rahul Gupta, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 16 days.

(21) Appl. No.: 16/232,172

(22) Filed: Dec. 26, 2018

(65) Prior Publication Data
US 2020/0207339 A1 Jul. 2, 2020

(51) Int. Cl.
| | | |
|---|---|---|
| *B60W 30/095* | (2012.01) | |
| *G05D 1/02* | (2020.01) | |
| *G05D 1/00* | (2006.01) | |
| *G06N 7/00* | (2006.01) | |
| *G06N 20/00* | (2019.01) | |
| *G06K 9/00* | (2006.01) | |

(52) U.S. Cl.
CPC ....... *B60W 30/0956* (2013.01); *G05D 1/0088* (2013.01); *G05D 1/0212* (2013.01); *G06K 9/00805* (2013.01); *G06N 7/005* (2013.01); *G06N 20/00* (2019.01); *B60W 2554/00* (2020.02); *G05D 2201/0213* (2013.01)

(58) Field of Classification Search
CPC ............. B60W 30/0956; B60W 30/09; B60W 50/0097; G06N 20/00; G06N 7/005; G05D 1/0088; G05D 1/0212; G05D 1/0289; G06K 9/00805; G08G 1/015; G08G 1/017; G01C 21/3492
See application file for complete search history.

(56) References Cited

U.S. PATENT DOCUMENTS

| | | | |
|---|---|---|---|
| 6,085,147 A * | 7/2000 | Myers | ................ G01C 21/3453 342/33 |
| 8,700,251 B1 | 4/2014 | Zhu et al. | |

(Continued)

*Primary Examiner* — Anne Marie Antonucci
*Assistant Examiner* — Andrew J Cromer
(74) *Attorney, Agent, or Firm* — Medley, Behrens & Lewis, LLC

(57) ABSTRACT

Various technologies described herein pertain to labeling sensor data generated by autonomous vehicles. A computing device identifies candidate path plans for an object in a driving environment of an autonomous vehicle based upon sensor data generated by sensor systems of the autonomous vehicle. The sensor data is indicative of positions of the object in the driving environment at sequential timesteps in a time period. Each candidate path plan is indicative of a possible maneuver being executed by the object during the time period. The computing device generates a weighted directed graph based upon the candidate path plans. The computing device determines a shortest path through the weighted directed graph. The computing device assigns a maneuver label to the sensor data based upon the shortest path, wherein the maneuver label is indicative of a maneuver that the object executes during the time period.

20 Claims, 14 Drawing Sheets

(56) References Cited

U.S. PATENT DOCUMENTS

| | | | |
|---|---|---|---|
| 8,874,372 B1 * | 10/2014 | Zhu | G01C 21/26 |
| | | | 382/103 |
| 9,511,767 B1 | 12/2016 | Okumura et al. | |
| 9,682,707 B1 | 6/2017 | Silver et al. | |
| 2014/0236414 A1 | 8/2014 | Droz et al. | |
| 2014/0288775 A1 | 9/2014 | Prakah-Asante et al. | |
| 2015/0160653 A1 * | 6/2015 | Cheatham, III | G05D 1/0088 |
| | | | 701/23 |

* cited by examiner

COMPUTING SYSTEM FOR ASSIGNING MANEUVER LABELS TO AUTONOMOUS VEHICLE SENSOR DATA

BACKGROUND

An autonomous vehicle is a motorized vehicle that can operate without a human driver. An exemplary autonomous vehicle includes a plurality of sensor systems, such as but not limited to, a lidar sensor system, a camera sensor system, and a radar sensor system, amongst others. The autonomous vehicle operates based upon sensor data output by the sensor systems.

As an autonomous vehicle moves about a driving environment, a prediction system of the autonomous vehicle generates predictions as to future paths of objects (e.g., vehicles, pedestrians, etc.) in the driving environment based upon the sensor data output by the sensor systems. The autonomous vehicle may base its operation in part on the predictions. For instance, the autonomous vehicle may select maneuvers to execute based upon the predictions.

Several deficiencies are associated with conventional prediction systems of autonomous vehicles. First, conventional prediction systems tend to rely on heuristic approaches in order to generate predictions. Heuristic approaches require an inordinate amount of hand-tuning in order to generate accurate predictions. Furthermore, heuristic approaches often lead to conflicting predictions when considering edge cases (i.e., driving scenarios that are unlikely to occur), especially when noisy sensor data is utilized. Second, conventional approaches are unable to accurately assign probabilistic confidence scores to potential maneuvers that may be undertaken by objects in a driving environment of an autonomous vehicle. Third, conventional approaches tend not to explicitly consider historical sensor data generated by a fleet of autonomous vehicles.

SUMMARY

The following is a brief summary of subject matter that is described in greater detail herein. This summary is not intended to be limiting as to the scope of the claims.

Described herein are various technologies that pertain to labeling sensor data generated by sensor systems of autonomous vehicles. More specifically, a computing device that assigns maneuver labels to sensor data indicative of objects in driving environments of autonomous vehicles is described herein. The computing device may generate a computer-implemented machine learning model based upon the sensor data and the maneuver labels assigned to the sensor data. An autonomous vehicle may provide second sensor data as input to the machine learning model in order to predict a maneuver that an object in a driving environment of the autonomous vehicle is to execute. The autonomous vehicle may then operate based upon the maneuver the object is predicted to execute.

In operation, a computing device receives sensor data generated by sensor systems of an autonomous vehicle. The sensor data is indicative of positions of an object in a driving environment of the autonomous vehicle at sequential timesteps in a time period. For example, the object may be a vehicle, a bicycle, or a pedestrian. The computing device identifies candidate path plans for the object based upon a position of the object detected based on the sensor data from the sensor systems. Each candidate path plan in the candidate path plans is indicative of a possible maneuver being executed by the object during the time period. In an example, the candidate path plans may correspond to lanes of a road.

The computing device generates a weighted directed graph based upon a relationship between consecutive candidate path plans. The weighted directed graph comprises nodes and weighted directed edges connecting at least a portion of the nodes. Each node in the nodes is assigned to a candidate path plan in the candidate path plans at a sequential timestep in the sequential timesteps. A weighted directed edge in the weighted directed edges is indicative of a transition relationship between a first candidate path plan in the candidate path plans at a first sequential timestep in the sequential timesteps and a second candidate path plan in the candidate path plans at a second sequential timestep in the sequential timesteps for the object.

The computing device determines a shortest path through the weighted directed graph. The computing device assigns a maneuver label to the sensor data based upon the shortest path. Using the shortest path, the computing device determines maneuver labels using properties of a (candidate) path plan at a current timestep as well as a relationship of the path plan at the current timestep with a next subsequent, distinct (candidate) path plan for the object. The computing device calculates a duration of a path change beginning from a time when the object expresses an intention to make the path change and ending when the object has completed their intention. The computing device may infer the intention of the object from a turn signal (of the object), horizontal velocity of the object toward and away from a path boundary and past kinematical behavior of the object. The maneuver label is indicative of a maneuver that the object executes during the time period. For instance, the maneuver label may be straight, left lane change, right lane change, left turn, right turn, stationary, or unknown.

The computing device executes an operation based upon the maneuver label and the sensor data. For instance, the computing device may generate a computer-implemented machine learning model based in part upon the sensor data and the maneuver label assigned to the sensor data. The machine learning model may be configured to generate predictions of maneuvers that are to be undertaken by objects in environments of autonomous vehicles.

As such, the computing device may cause the machine learning model to be loaded into memory of the autonomous vehicle (or another autonomous vehicle). As the autonomous vehicle operates, the autonomous vehicle may provide second sensor data generated by the sensor systems of the autonomous vehicle as input to the machine learning model. The second sensor data may be indicative of a second object in a second driving environment of the autonomous vehicle. The machine learning model may output an indication of a maneuver that the second object is predicted to execute. The autonomous vehicle may then operate based upon the indication of the maneuver that the second object is predicted to execute. For instance, the autonomous vehicle may control at least one of a vehicle propulsion system of the autonomous vehicle, a braking system of the autonomous vehicle, or a steering system of the autonomous vehicle based upon the maneuver that the second object is predicted to execute.

The above-described technologies present various advantages over conventional prediction systems in autonomous vehicles. First, by generating labeled sensor data that is used to generate a machine learning model, the above-described technologies obviate the need for excessive hand-tuning associated with a heuristic approach. Second, unlike heuristic approaches, the machine learning model described above (generated from the labeled sensor data) is less susceptible to noisy data than conventional heuristic approaches. Third, by assigning labels to sensor data generated by a fleet of autonomous vehicles, historical sensor data generated by the fleet may be more readily utilized in generating the machine learning model.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
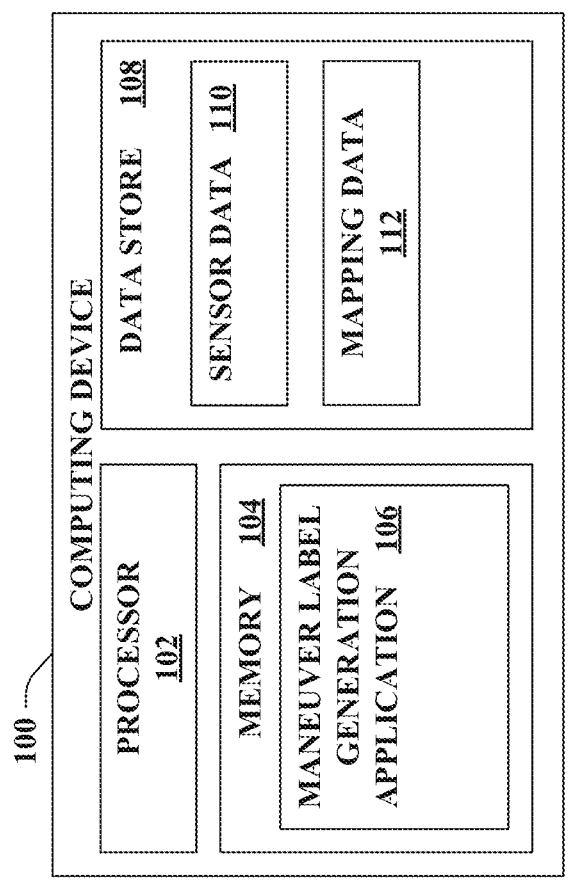
FIG. 1 illustrates a functional block diagram of an exemplary computing device.

Various technologies pertaining to assigning maneuver labels to sensor data generated by sensor systems of autonomous vehicles are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

Referring now to FIG. 1, an exemplary computing device 100 is illustrated. The computing device 100 comprises a processor 102 and memory 104, wherein the memory 104 has a maneuver label generation application 106 loaded therein. In general, the maneuver label generation application 106 (when executed by the processor 102) is configured to assign maneuver labels to sensor data generated by sensor systems of autonomous vehicles.

The computing device 100 may further include a data store 108. The data store 108 comprises a plurality of sensor data 110 generated by sensor systems of a plurality of autonomous vehicles. The plurality of sensor data 110 is indicative of positions of objects in driving environments of the plurality of autonomous vehicles during time periods. For instance, the objects may include vehicles, bicycles, and pedestrians.

The data store 108 further comprises mapping data 112. The mapping data 112 comprises maps of driving environments in which path plans at positions in the driving environments are marked, wherein the path plans are indicative of possible maneuvers that can be executed by an object at the positions reflected in one or more of the maps.

Figure 2:
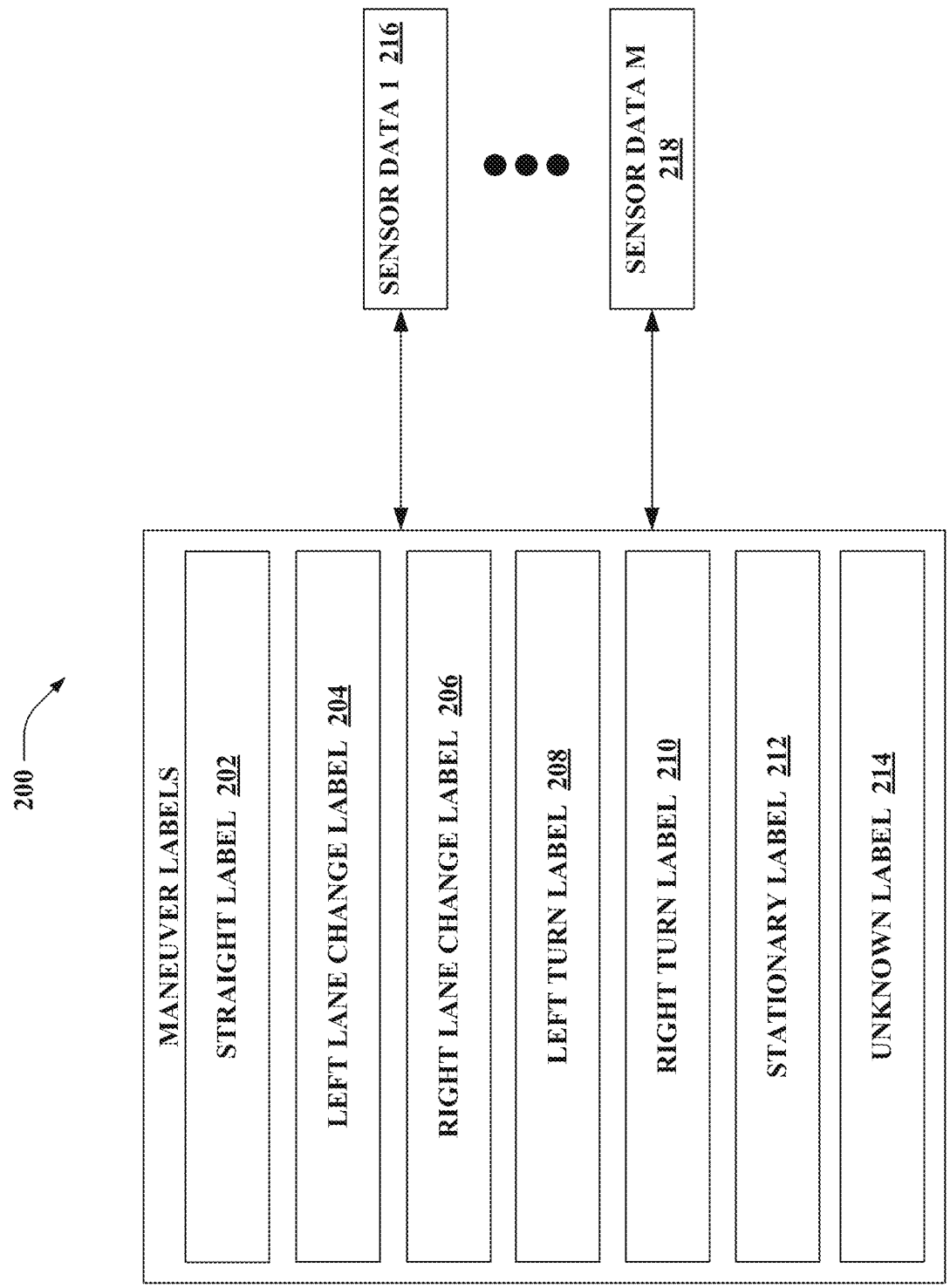
FIG. 2 illustrates assigning maneuver labels to sensor data generated by autonomous vehicles.

With reference now to FIG. 2, an illustration 200 of assigning maneuver labels to sensor data is illustrated. As will be described in greater below, the maneuver label generation application 106 is configured to assign maneuver labels 202-214 to a plurality of sensor data 216-218 generated by autonomous vehicles, namely sensor data 1 216, . . . , and sensor data M 218, where M can be substantially any integer greater than 1. The plurality of sensor data 216-218 may be or include the plurality of sensor data 110 and the plurality of sensor data 110 may be or include the plurality of sensor data 216-218.

As shown in FIG. 2, the maneuver labels 202-214 include a straight label 202, a left lane change label 204, a right lane change label 206, a left turn label 208, a right turn label 210, a stationary label 212, and an unknown label 214. The unknown label 214 captures maneuvers executed by objects that are not captured by the maneuver labels 202-212. In an example, the maneuver label generation application 106 can assign one of the maneuver labels 202-214 to the sensor data 1 216 and one of the maneuver labels 202-214 to the sensor data M 218. Thus, the maneuver label generation application 106 generates labeled sensor data.

Figure 3:
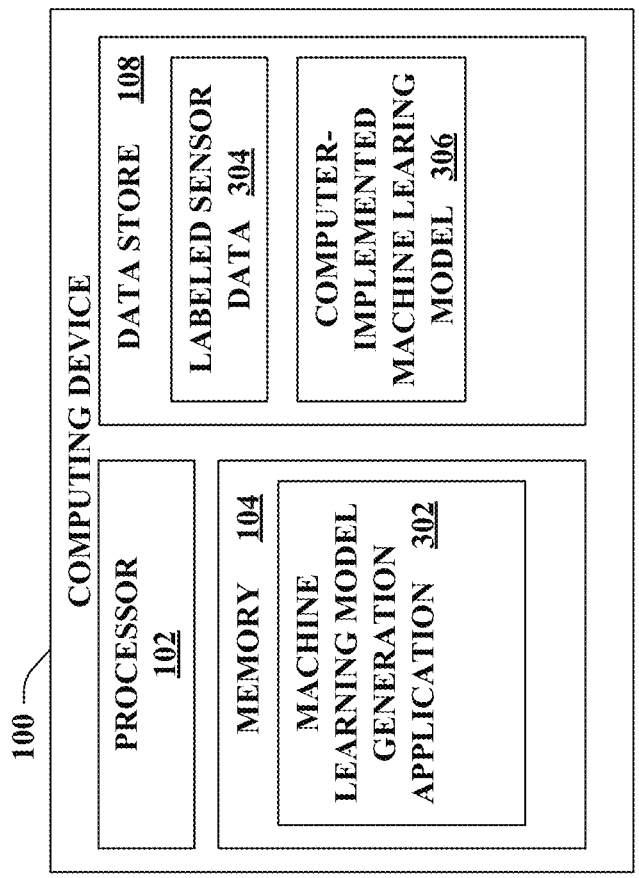
FIG. 3 illustrates a functional block diagram of an exemplary computing device.

Turning now to FIG. 3, the exemplary computing device 100 according to various embodiments illustrated. As depicted in FIG. 3, the memory 104 of the computing device 100 further includes a machine learning model generation application 302. In general, the machine learning model generation application 302 (when executed by the processor 102) is configured to generate a computer-implemented machine learning model 306 based upon sensor data that has been assigned maneuver labels by the maneuver label generation application 106.

The data store 108 of the computing device 108 comprises labeled sensor data 304. The labeled sensor data 304 comprises a plurality of sensor data (e.g., the plurality of sensor data 110) generated by sensor systems of a plurality of autonomous vehicles and maneuver labels assigned to the plurality of sensor data. In an example, the labeled sensor data 304 may include first sensor data that is indicative of positions of an object at sequential timesteps in a time period and a first maneuver label (e.g., straight, right turn, left turn, etc.) assigned to the first sensor data.

The data store 108 may also comprise the computer implemented machine learning model 306. In general, the machine learning model 306 is configured to output an indication of a maneuver that an object in a driving environment of an autonomous vehicle is predicted to execute based upon sensor data generated by sensor systems of the autonomous vehicle. The computing device 100 may generate the machine learning model 306 based upon the labeled sensor data 304.

In an embodiment, the machine learning model 306 may be or include an artificial neutral network (ANN), a deep neural network (DNN), a recurrent neural network (RNN), a long short-term memory (LSTM) RNN, or a convolutional neural network (CNN). The machine learning model 306 may also be or include a support vector machine (SVM), a Bayesian classifier, or other suitable classifier. Furthermore, the machine learning model 306 may be or include a decision tree or a random forest.

In an example, the machine learning model 306 may comprise nodes and edges that couple nodes in the machine learning model 306. Each edge is assigned a learned weight, wherein the learned weight can be learned using a supervised or semi-supervised learning procedure. Accordingly, for instance, a learned weight assigned to an edge can be influenced by a plurality of sensor data from a plurality of autonomous vehicles. The machine learning model 306 may take sensor data generated by an autonomous vehicle as input. The sensor data may be indicative of an object in a driving environment of the autonomous vehicle. The machine learning model 306 outputs an indication of a maneuver that the object is predicted to execute based upon learned weights of the edges and the sensor data.

In an embodiment, the machine learning model 306 may be configured to generate a probability distribution over possible maneuvers that can be executed by an object in a driving environment. For instance, if the possible maneuvers include a first maneuver and a second maneuver, the machine learning model 306 may output a first probability that the object is to execute the first maneuver and a second probability that the object is to execute the second maneuver.

Figure 4:
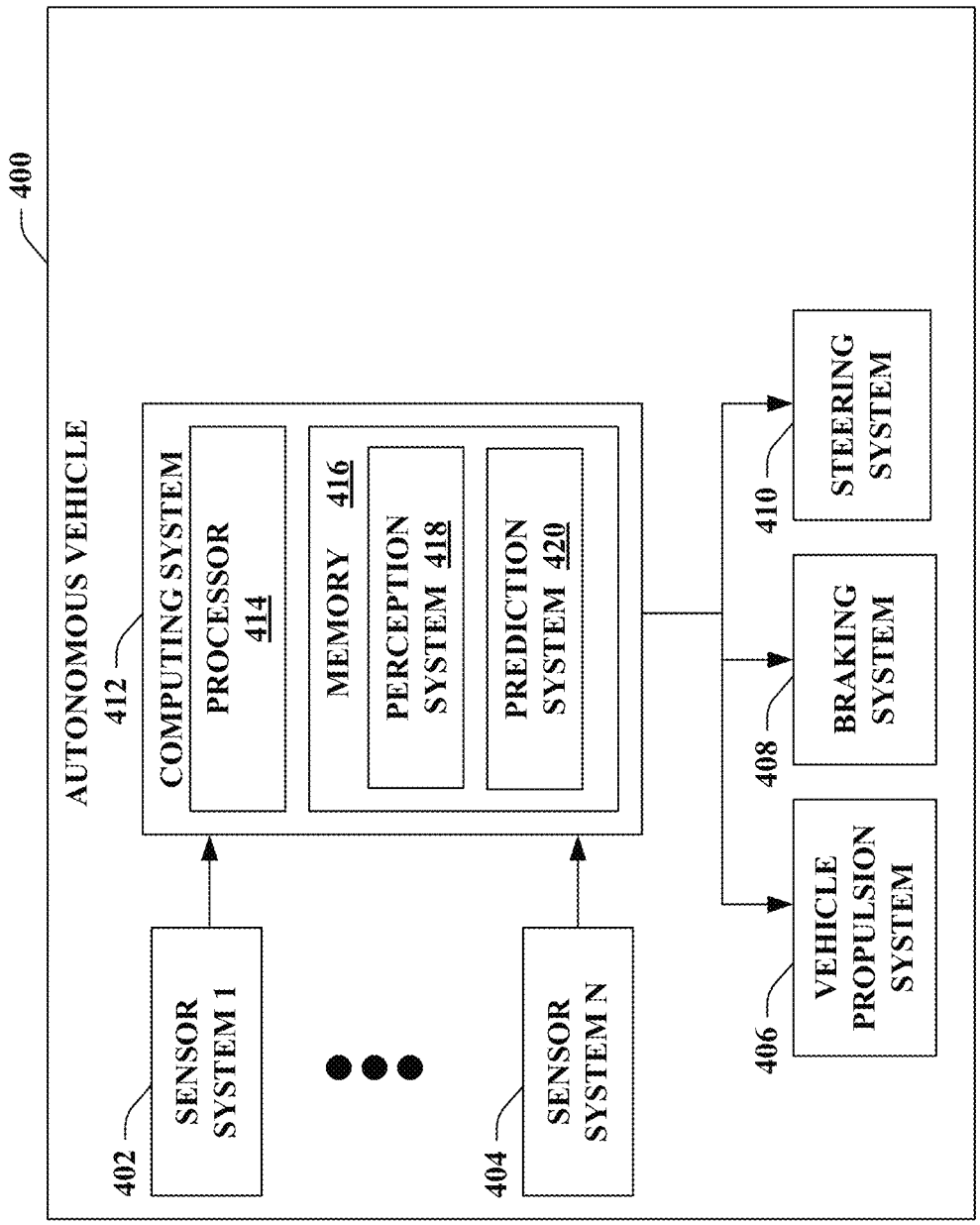
FIG. 4 illustrates a functional block diagram of an exemplary autonomous vehicle.

Turning now to FIG. 4, an autonomous vehicle 400 is illustrated. The autonomous vehicle 400 can navigate about roadways without human conduction based upon sensor data (i.e., sensor signals) outputted by sensor systems of the autonomous vehicle 400. The autonomous vehicle 400 includes sensor systems, namely, a sensor system 1 402, . . . , and a sensor system N 404, where N can be substantially any integer greater than 1 (collectively referred to herein as sensor systems 402-404). The sensor systems 402-404 are of different types and are arranged about the autonomous vehicle 400. For example, the sensor system 1 402 may be a lidar sensor system and the sensor system N 404 may be a camera sensor (image) system. Other exemplary sensor systems included in the sensor systems 402-404 can include radar sensor systems, satellite-based radio navigation sensor systems (e.g., global positioning system (GPS) sensor systems), sonar sensor systems, infrared sensor systems, and the like. The sensor systems 402-404 generate (i.e., output) sensor data. For instance, the radar sensor systems can generate radar sensor data, the lidar sensor systems can generate lidar sensor data, the camera sensor systems can generate camera sensor data, etc.

The autonomous vehicle 400 further includes several mechanical systems that are used to effectuate appropriate motion of the autonomous vehicle 400. For instance, the mechanical systems can include, but are not limited to, a vehicle propulsion system 406, a braking system 408, and a steering system 410 (collectively, "the mechanical systems 406-410"). The vehicle propulsion system 406 may be an electric motor, an internal combustion engine, or a combination thereof. The braking system 408 can include an engine brake, brake pads, actuators, and/or any other suitable componentry that is configured to assist in decelerating the autonomous vehicle 400. The steering system 410 includes suitable componentry that is configured to control the direction of movement of the autonomous vehicle 400.

The autonomous vehicle 400 further comprises a computing system 412. The computing system 412 comprises a processor 414 and memory 416. The memory 416 may have a perception system 418 and a prediction system 420 loaded therein. In general, the perception system 418 (when executed by the processor 414) is configured to facilitate detection of objects in driving environments of the autonomous vehicle 400. The prediction system 420 (when executed by the processor 414) is configured to generate predictions of future paths of objects in the driving environment of the autonomous vehicle 400.

Figure 5:
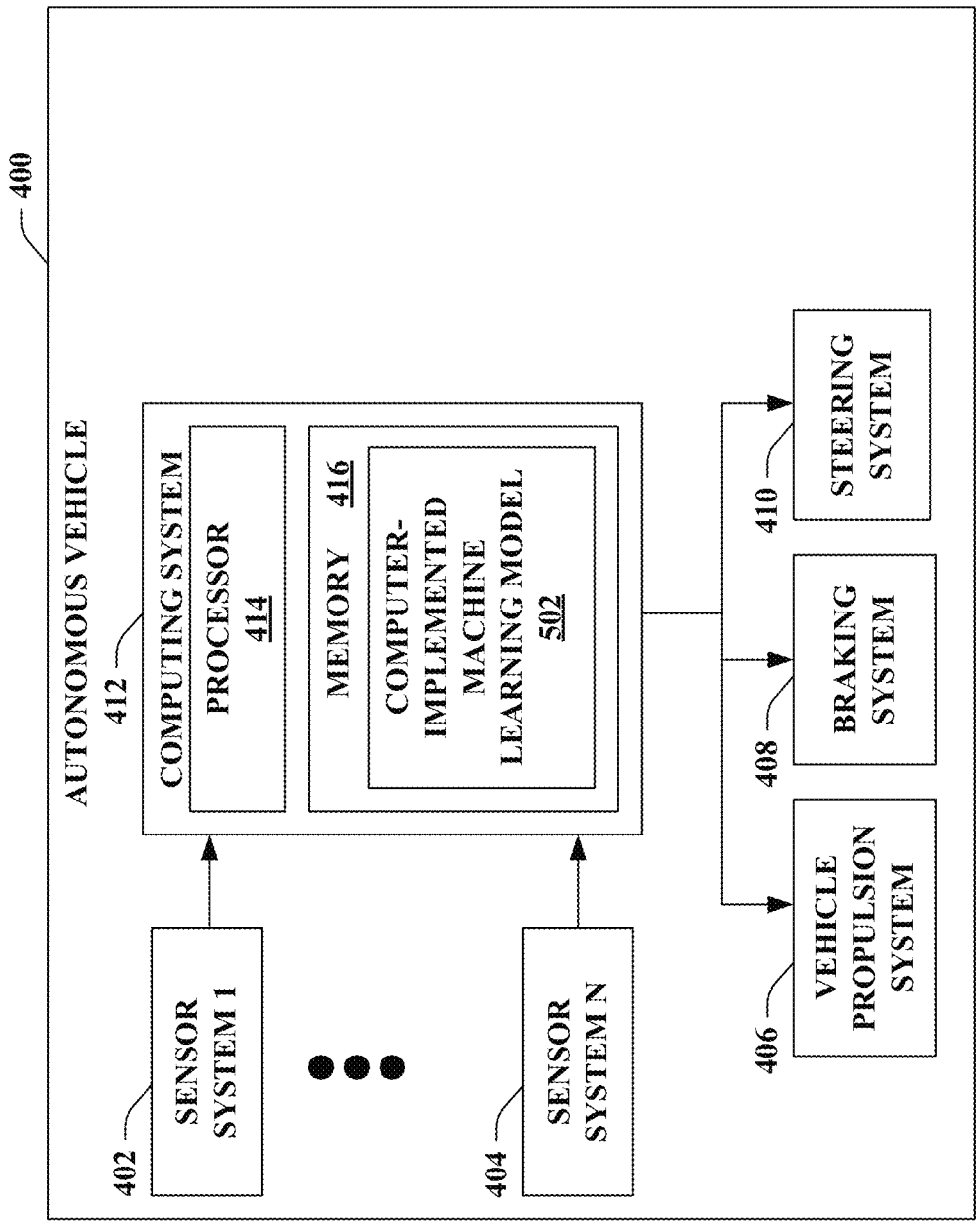
FIG. 5 illustrates a functional block diagram of an exemplary autonomous vehicle.

Referring now to FIG. 5, the autonomous vehicle 400 according to various embodiments is illustrated. The autonomous vehicle 400 includes the sensor systems 402-404, the mechanical systems 406-410, and the computing system 412 (including the processor 414, the memory 416, the perception system 418, and the prediction system 420).

As depicted in FIG. 5, the memory 416 of the autonomous vehicle 400 further comprises a computer-implemented machine learning model 502. In an example, the machine learning model 502 may be or include the machine learning model 306 described above. The machine learning model 306 may also be or include the machine learning model 502. The machine learning model 502 may be part of the prediction system 420. The computing system 412 of the autonomous vehicle 400 may provide sensor data generated by the sensor systems 402-404 as input to the machine learning model 502. The sensor data is indicative of an object in a driving environment of the autonomous vehicle 400. The machine learning model 502 may then output an indication of a maneuver that the object is predicted to execute based in part upon the sensor data.

With reference generally now to FIGS. 1-5, operation of the computing device 100 and the autonomous vehicle 400 is now set forth. The computing device 100 receives sensor data generated by the sensor systems 402-404 of the autonomous vehicle 400. The sensor data is indicative of positions of an object in a driving environment of the autonomous vehicle 400 at sequential timesteps in a time period. In a non-limiting example, the object may be a vehicle, such as a car, a truck, or a motorcycle, a bicycle, or a pedestrian. In an embodiment, the time period may range from 1 to 6 seconds. For instance, the time period may range from 1.5 to 5.5 seconds, from 2 to 4 seconds, or from 3 to 3.5. The sequential timesteps may occur every 0.05 to 0.2 seconds. For instance, the sequential timesteps may occur every 0.1 to 0.18 seconds, every 0.12 to 0.16 seconds, or every 0.13 to 0.15 seconds.

The maneuver label generation application 106 executing on the computing device 100 then identifies candidate path plans for the object in the driving environment of the autonomous vehicle 400 based upon a position of the object detected based on the sensor data from the sensor systems 402-404. Each candidate path plan in the candidate path plans is indicative of a possible maneuver being executed by the object during the time period. For instance, a first candidate path plan may be executing a left turn and a second candidate path plan may be executing a left lane change. In an example, the candidate path plans may correspond to lanes of a road.

The maneuver label generation application 106 may identify the candidate path plans further based upon the mapping data 112. More specifically, the maneuver label generation application 106 may execute a search over the mapping data 112 based upon the positions of the object indicated by the sensor data. The search produces search results, wherein the search results include the candidate path plans.

The maneuver label generation application 106 generates a weighted directed graph based upon the candidate path plans. The weighted directed graph comprises nodes and weighted directed edges connecting at least a portion of the nodes. Each node in the nodes is assigned to a candidate path plan in the candidate path plans at a sequential timestep. A weighted directed edge in the weighted directed edges is indicative of a transition relationship between a first candidate path plan at a first sequential timestep in the sequential timesteps and a second candidate path plan at a second sequential timestep in the sequential timesteps for the object.

The maneuver label generation application 106 then determines a shortest path through the weighted directed graph by applying a shortest path algorithm to the weighted directed graph. For instance, the maneuver label generation application 106 may apply Dijkstra's algorithm, a Bellman-Ford algorithm, or a Floyd-Warshall algorithm to the weighted directed graph in order to determine the shortest path.

In an embodiment, prior to determining the shortest path through the weighted directed graph, the maneuver label generation application 106 may prune the weighted directed graph by removing weighted directed edges that fail to exceed a certain weight threshold. The maneuver label generation application 106 may also remove unconnected nodes in the weighted directed graph.

The maneuver label generation application 106 then assigns a maneuver label in the maneuver labels 202-214 to the sensor data based upon the shortest path. More specifically, the maneuver label generation application 106 may assign the maneuver label using the shortest path by determining properties of a (candidate) path plan at a current timestep as well as a relationship of the (candidate) path plan at the current timestep with a next subsequent, distinct (candidate) path plan for the object. The maneuver label generation application 106 calculates a duration of a path change maneuver from a time that begins when the object expresses the intention (as determined via the sensor data) to make the path change and ends when the object has finished their intention (as determined via the sensor data). More specifically, the maneuver label generation application 106 may infer the intention from turn signals (of the object), horizontal velocity of the object toward and away from a path boundary and past kinematical behavior of the object. Thus, the maneuver label generation application 106 generates labeled sensor data, wherein the labeled sensor data comprises the sensor data and the maneuver label.

The computing device 100 (or another computing device) then performs an operation based upon labeled sensor data (i.e., the maneuver label and the sensor data). For instance, the machine learning model generation application 302 may generate the computer-implemented machine learning model 306 (described above) based upon the sensor data and the maneuver label assigned to the sensor data. As described above, the machine learning model 306 is configured to predict maneuvers that objects in driving environments of autonomous vehicles are to perform.

Subsequently, the computing device 100 may cause the machine learning model 306 (referred to hereafter as the machine learning model 502) to be loaded in the memory 416 of the computing system 412 of the autonomous vehicle 400 (or another autonomous vehicle). As the autonomous vehicle 400 operates, the sensor systems 402-404 generate second sensor data. The second sensor data may be indicative of a second object in the driving environment of the autonomous vehicle 400 (or a second driving environment of the autonomous vehicle 400). The computing system 412 of the autonomous vehicle 400 receives the second sensor data. The computing system 412 provides the second sensor data as input to the machine learning model 502 described above. The machine learning model 502 outputs an indication of a maneuver that the second object is predicted to execute based upon the second sensor data. In an embodiment, the maneuver that the second object is predicted to execute may occur within a time period that extends 6 to 10 seconds from a time at which the computing system 412 receives the second sensor data. For instance, the time period may extend from 6.5 to 9 seconds, from 7 to 8.5 seconds, or from 7.5 to 8 seconds.

The computing system 412 of the autonomous vehicle 400 then controls at least one of the vehicle propulsion system 406, the braking system 408, or the steering system 410 based upon the indication of the maneuver that the second object is predicted to execute. More specifically, the computing system 412 of the autonomous vehicle 400 may control at least one of the vehicle propulsion system 406, the braking system 408, or the steering system 410 to execute a second maneuver based upon the indication of the maneuver that the second object is predicted to execute. For instance, the second maneuver may be maintaining a straight heading, a left lane change, a right lane change, a left turn, a right turn, or remaining stationary.

Figure 6:
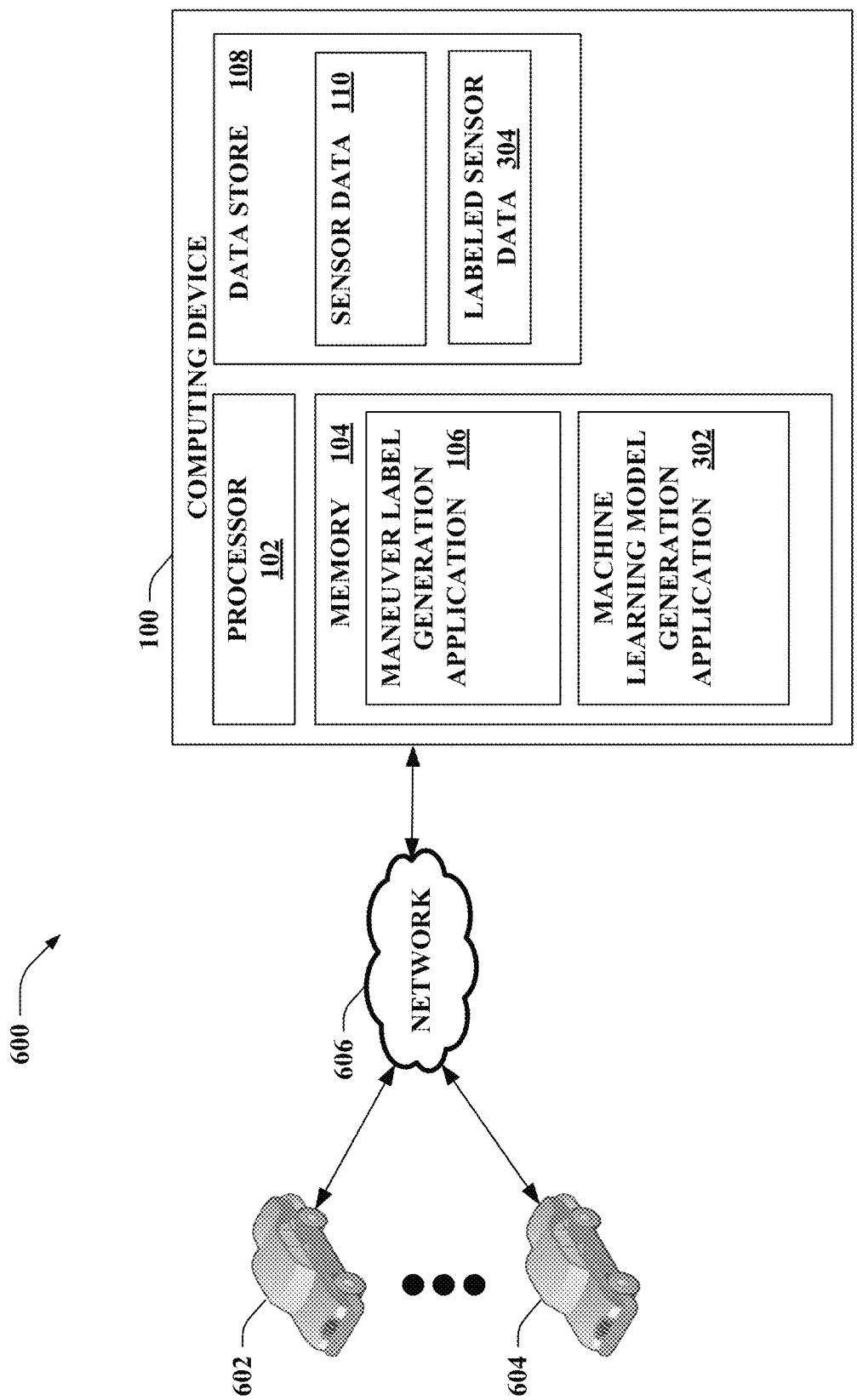
FIG. 6 illustrates an exemplary computing environment.

Turning now to FIG. 6, an exemplary computing environment 600 is illustrated. The computing environment 600 includes the computing device 100 described above. The computing environment 600 also includes a plurality of autonomous vehicles, namely an autonomous vehicle 1 602, . . . , and an autonomous vehicle P 604, where P can be substantially any integer greater than 1. The autonomous vehicle 400 described above may be included in the plurality of autonomous vehicles 602-604. Furthermore, each autonomous vehicle in the plurality of autonomous vehicles 602-

604 may include components similar or identical to the components of the autonomous vehicle 400 described above.

The plurality of autonomous vehicles 602-604 and the computing device 100 are in communication via a network 606 (or several networks). As the plurality of autonomous vehicles 602-604 move about driving environments, a plurality of sensor systems of the plurality of autonomous vehicles 602-604 generate a plurality of sensor data. The plurality of autonomous vehicles 602-604 may transmit the plurality of sensor data to the computing device 100. The computing device 100 (by way of the maneuver label generation application 106) may then assign maneuver labels to the sensor data as described above, thereby generating the labeled sensor data 304. Moreover, the computing device 100 (by way of the machine learning model generation application 302) may generate the machine learning model 306 and/or the machine learning model 502 based upon the labeled sensor data 304.

Although the above-described process has been described as assigning a maneuver label to a single set of sensor data, it is to be understood that the above-described process may be employed many times to label many different sets of sensor data generated by the plurality of sensor systems of the plurality of autonomous vehicles 602-604. Furthermore, although the maneuver label generation application 106 and the machine learning model generation application 302 are described as executing on the computing device 100, it is to be understood that the maneuver label generation application 106 and the machine learning model generation application 302 may execute on separate computing devices.

Figure 7:
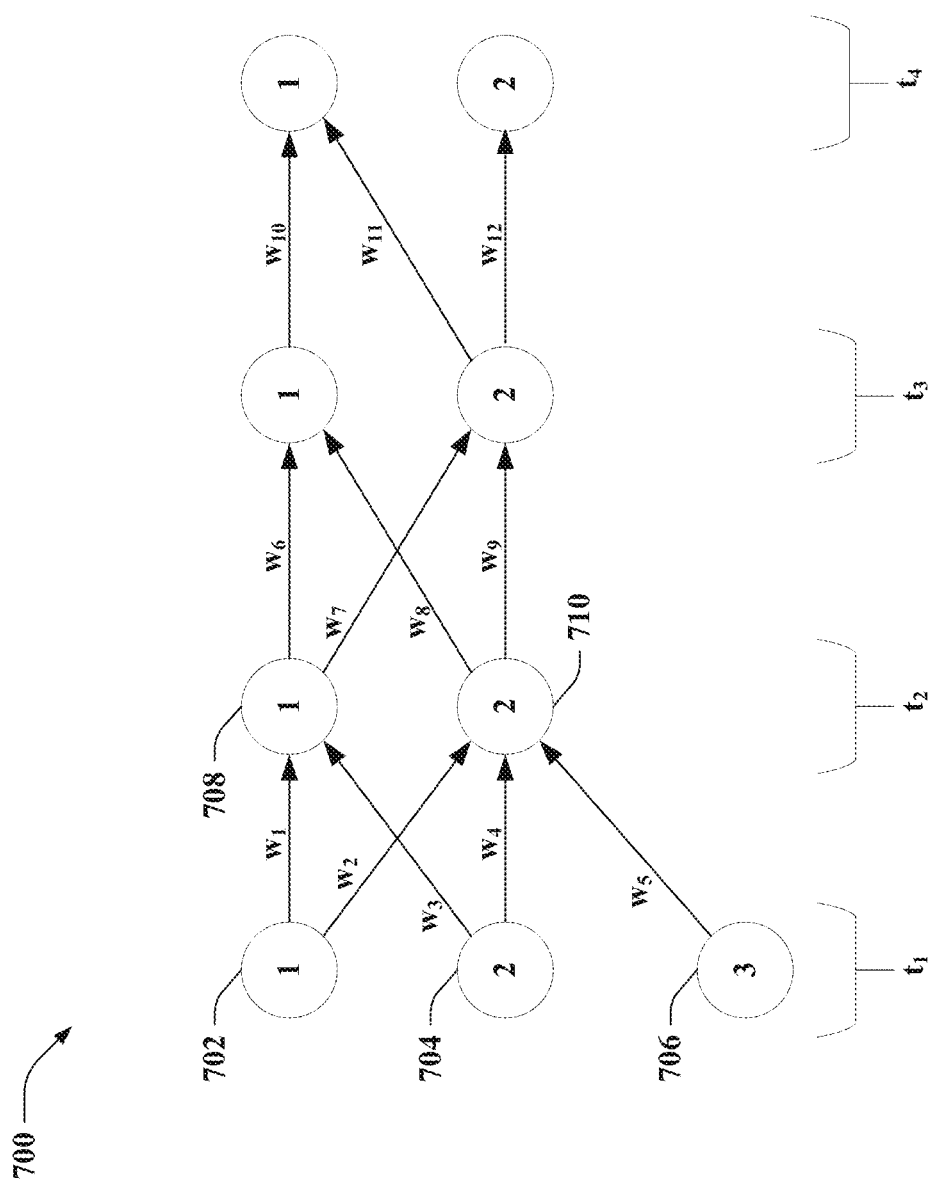
FIG. 7 illustrates a weighted directed graph.

Referring now to FIG. 7, an exemplary weighted directed graph 700 is illustrated. The maneuver label generation application 106 described above may generate the weighted directed graph 700 based upon candidate path plans for an object in a driving environment of an autonomous vehicle (e.g., the autonomous vehicle 400). The weighted graph 700 represents four sequential timesteps: $t_1$, $t_2$, $t_3$, and $t_4$. The weighted directed graph 700 comprises nodes (indicated by circles in FIG. 7) and weighted directed edges (indicated by arrows and $w_1$ to $w_{12}$ in FIG. 7). Each node in the nodes is indicative of a candidate path plan of the object at one of the sequential timesteps $t_1$ to $t_4$. For instance, as depicted in FIG. 7, at timestep $t_1$, the weighted directed graph 700 includes first nodes 702-706: a first node 702 (assigned to a first candidate path plan), a second node 704 (assigned to a second candidate path plan), and a third node 706 (assigned to a third candidate path plan). The first nodes 702-706 are assigned to a first subset of candidate path plans in the candidate path plans. At timestep $t_2$, the weighted directed graph 700 includes second nodes 708-710: a fourth node 708 (assigned to the first candidate path plan) and a fifth node 710 (assigned to the second candidate path plan). The second nodes in the nodes are assigned to a second subset of candidate path plans in the candidate path plans. The weighted edges $w_1$ to $w_5$ (i.e., a subset of the weighted edges $w_1$ to $w_{12}$) connect at least some of the first nodes 702-706 at timestep $t_1$ to at least some of the second nodes 708-710 at timestep $t_2$.

Figure 8:
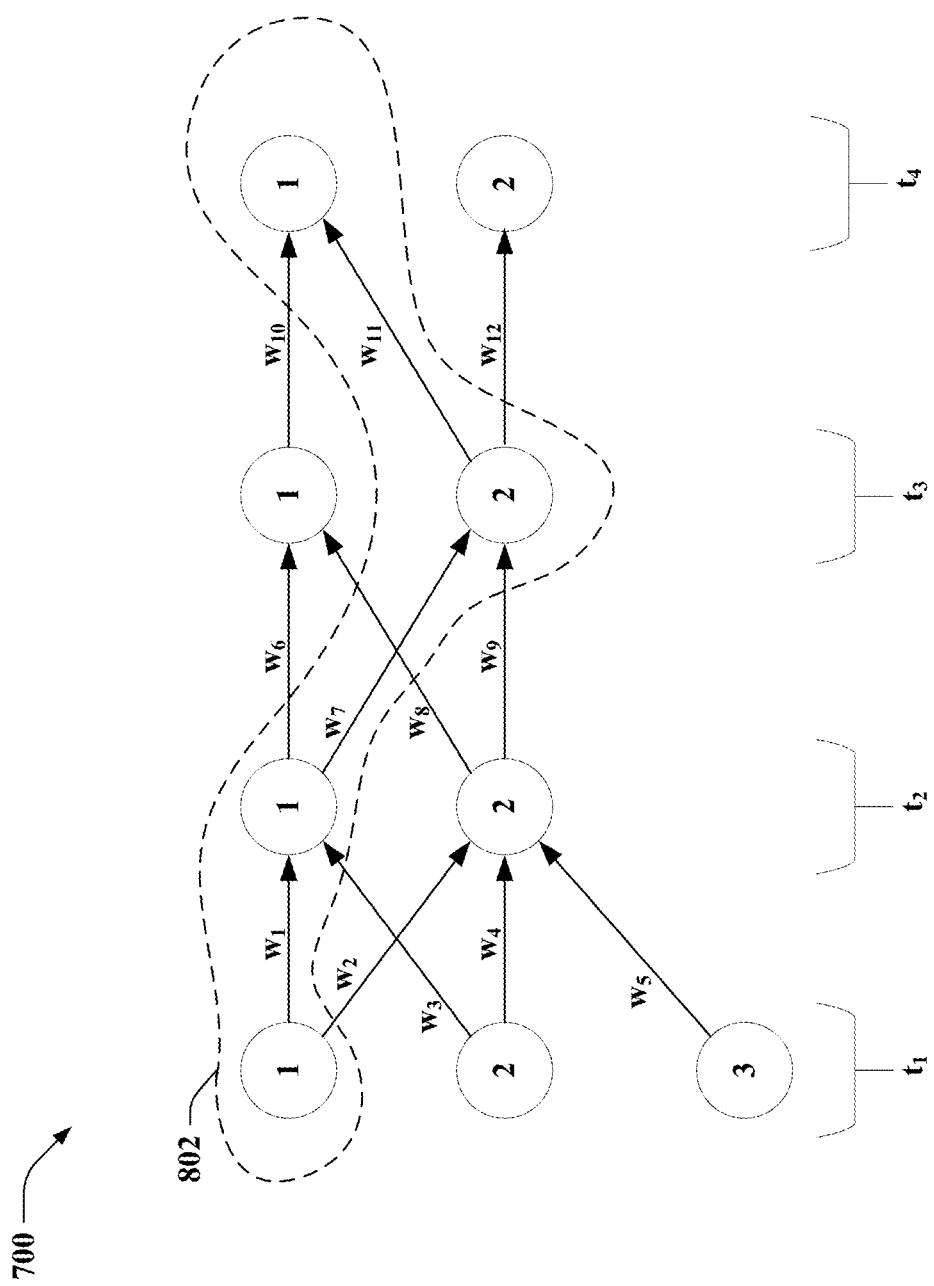
FIG. 8 illustrates a shortest path in the weighted directed graph illustrated in FIG. 7.

Referring now to FIG. 8, a shortest path 802 through the weighted directed graph 700 is illustrated. More specifically, the shortest path 802 is a path from a node at a first timestep (e.g., $t_1$) to a node at a last timestep (e.g., $t_4$) such that a sum of the weights along the path is minimized. The maneuver label generation application 106 described above may determine the shortest past 802 by applying a shortest path algorithm to the weighted directed graph 700. For instance, the shortest path algorithm may be Dijkstra's algorithm, a Bellman-Ford algorithm, or a Floyd-Warshall algorithm.

Figure 9:
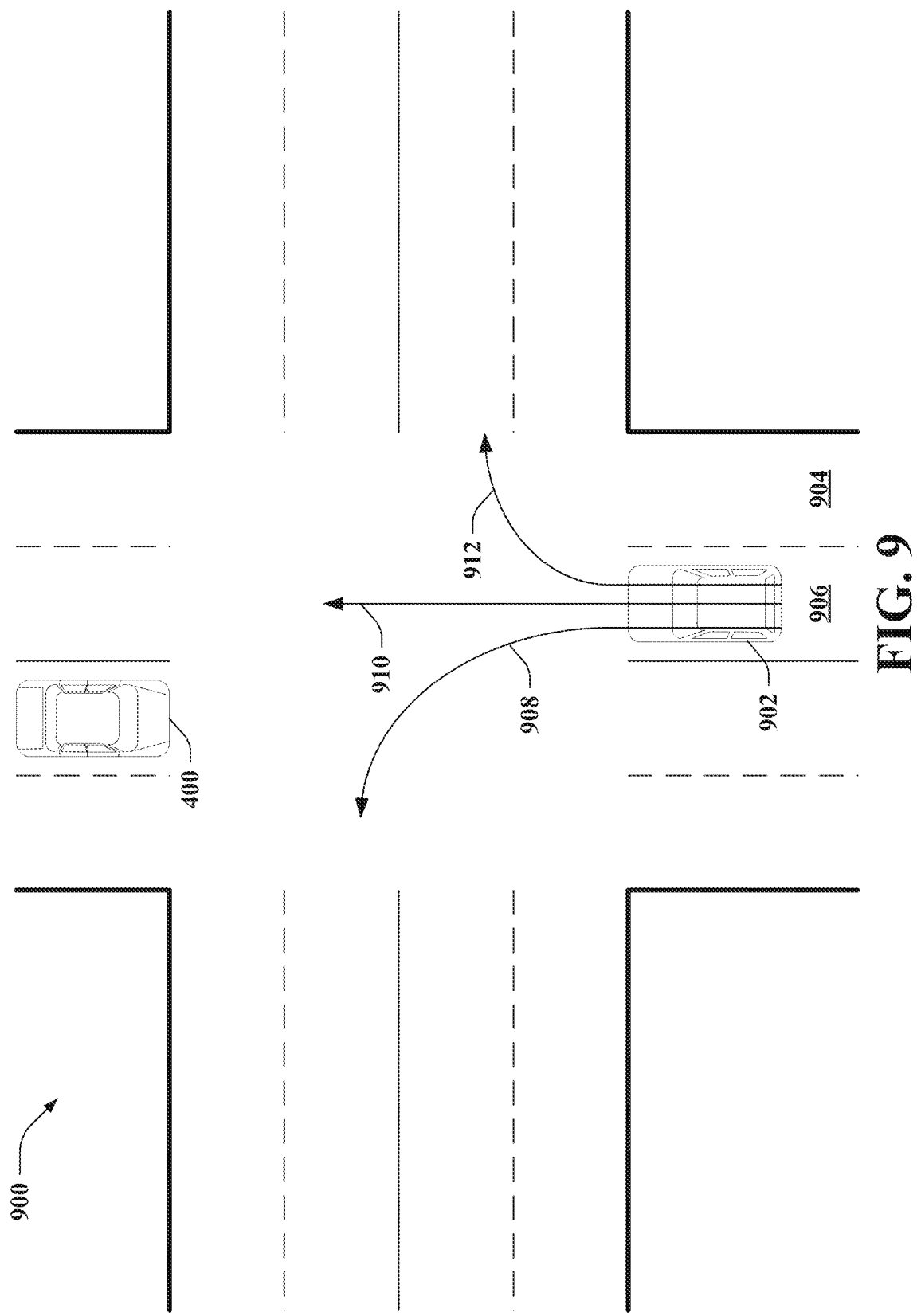
FIG. 9 illustrates an exemplary driving environment of an autonomous vehicle.

Turning now to FIG. 9, a top-down view of a driving environment 900 is illustrated. As depicted in FIG. 9, the driving environment 900 includes a four-way intersection, the autonomous vehicle 400 described above, and a vehicle 902 (i.e., an object). The autonomous vehicle 400 and the vehicle 902 are approaching the intersection from opposite directions.

It is contemplated that the vehicle 902 has recently moved from a right lane 904 to a left lane 906 in the driving environment 900. As such, it may be ambiguous as to whether the vehicle 902 is to execute a left hand turn 908, continue a straight heading 910, or execute a (wide) right turn 912. Using the above-described processes, the autonomous vehicle 400 may provide sensor data generated by the sensor systems 402-404 as input to the machine learning model 502. The machine learning model 502 may then output an indication of a maneuver that the vehicle 902 is predicted to execute. For instance, the machine learning model 502 may be configured to output a probability distribution over the left hand turn 908, the straight heading 910, and the right turn 912. The autonomous vehicle 400 may then operate based upon the indication of the maneuver that the vehicle 902 is predicted to execute.

Figure 10:
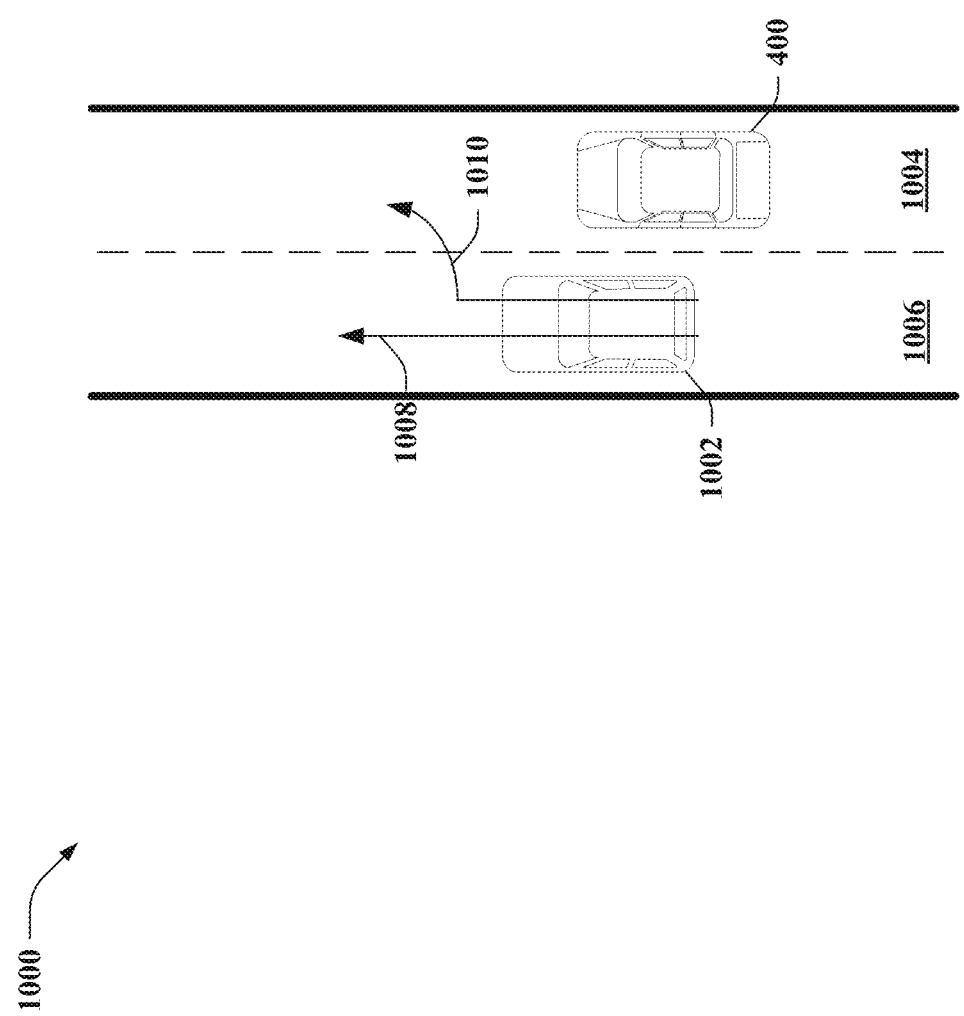
FIG. 10 illustrates an exemplary driving environment of an autonomous vehicle.

With reference now to FIG. 10, a top-down view of a driving environment 1000 is illustrated. As depicted in FIG. 10, the driving environment 1000 includes a two-lane road, the autonomous vehicle 400 described above, and a vehicle 1002 (i.e., an object). The two-lane road includes a right lane 1004 and a left lane 1006.

It is contemplated that the vehicle 1002 has recently moved from the right lane 1004 to the left lane 1006 in the driving environment 1000. As such, it may be ambiguous as to whether the vehicle 1002 is to continue a straight heading 1008 or execute a right lane change 1010. Using the above-described processes, the autonomous vehicle 400 may provide sensor data generated by the sensor systems 402-404 as input to the machine learning model 502. The machine learning model 502 may then output an indication of a maneuver that the vehicle 1002 is predicted to execute. For instance, the machine learning model 502 may be configured to output a probability distribution over the straight heading 1008 and the right lane change 1010. The autonomous vehicle 400 may then operate based upon the indication of the maneuver that the vehicle 1002 is predicted to execute.

Figure 11:
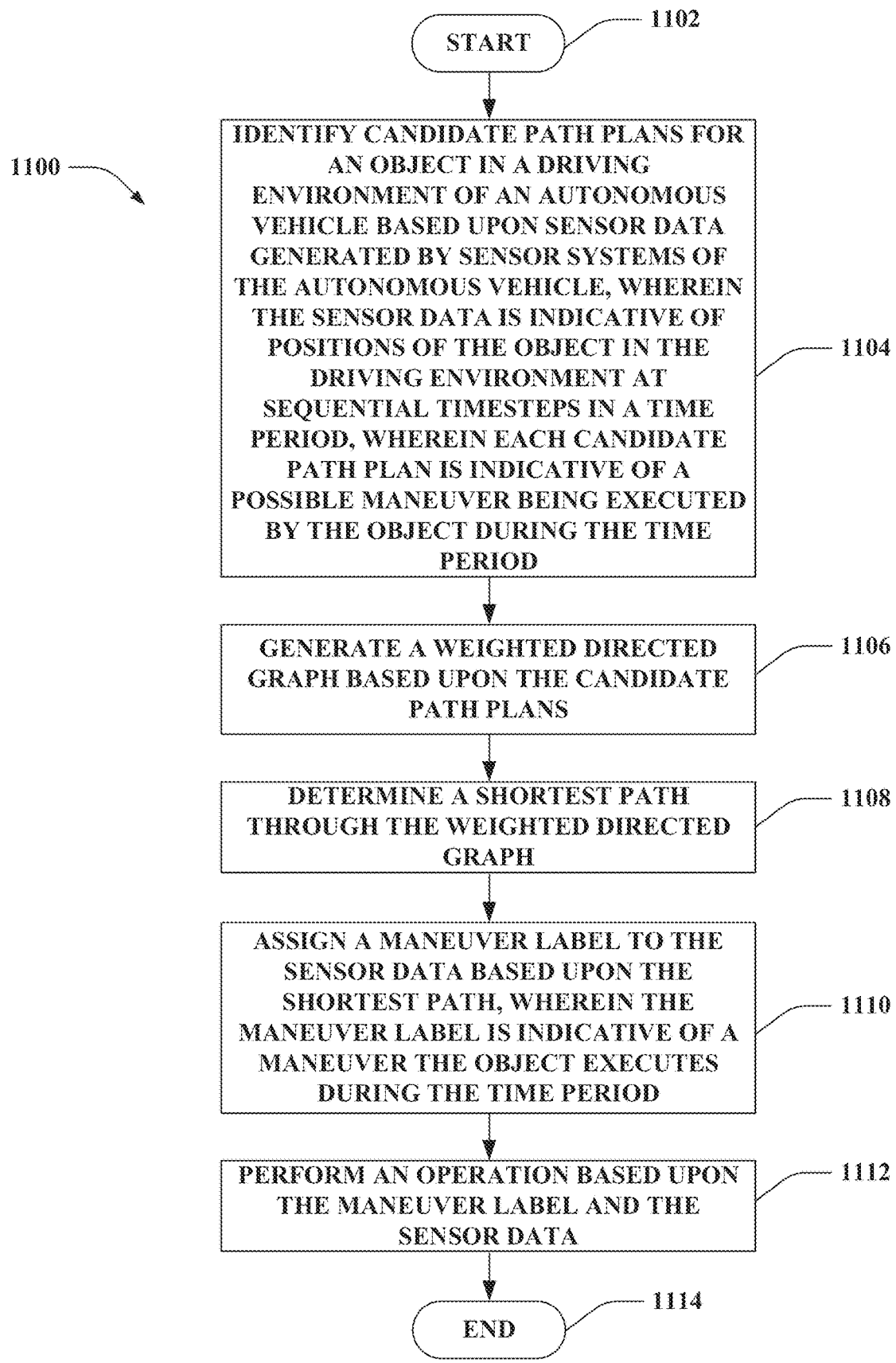
FIG. 11 is a flow diagram that illustrates an exemplary methodology performed by a computing device for assigning labels to sensor data generated by an autonomous vehicle.
Figure 12:
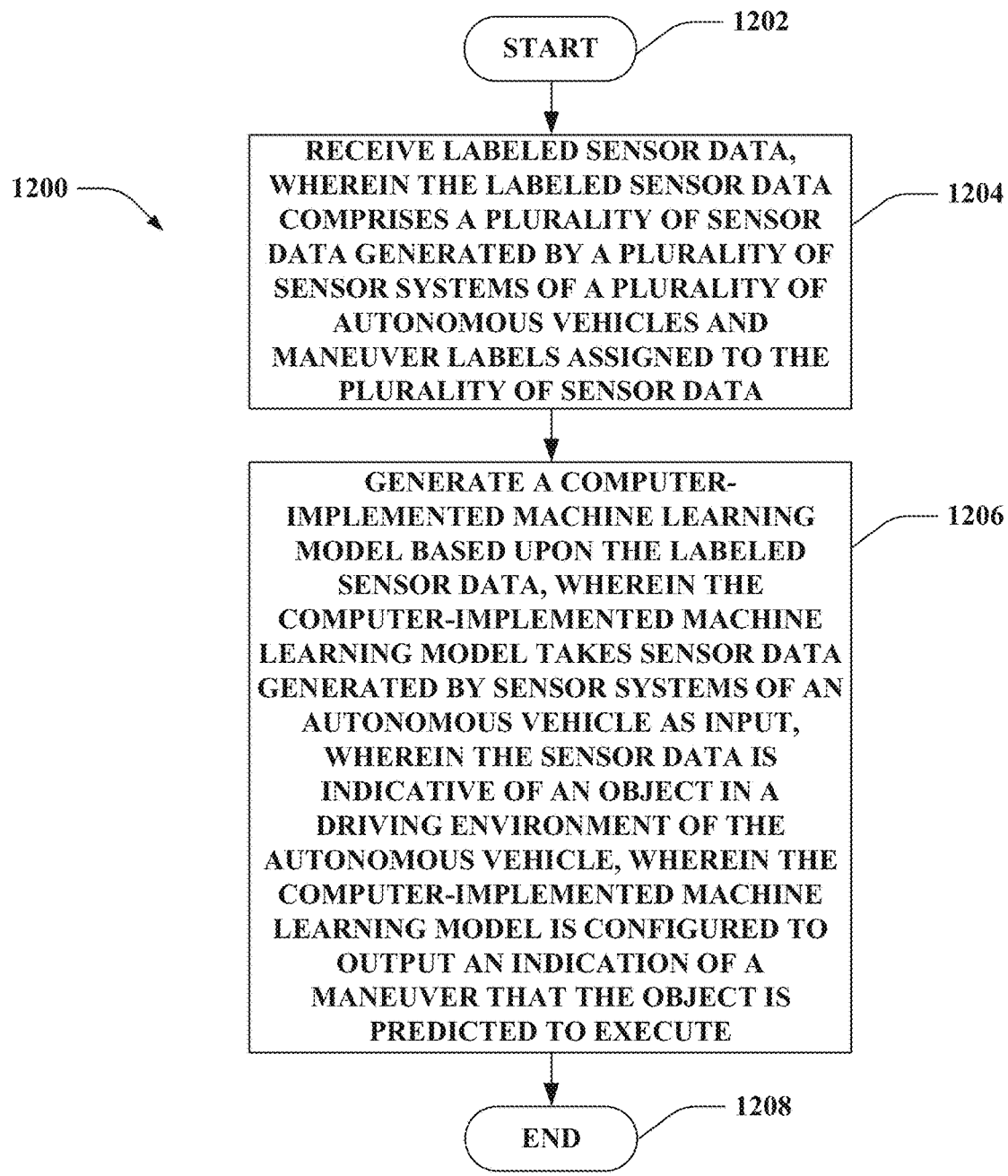
FIG. 12 is a flow diagram that illustrates an exemplary methodology performed by a computing device for generating a machine learning model based upon labeled sensor data.
Figure 13:
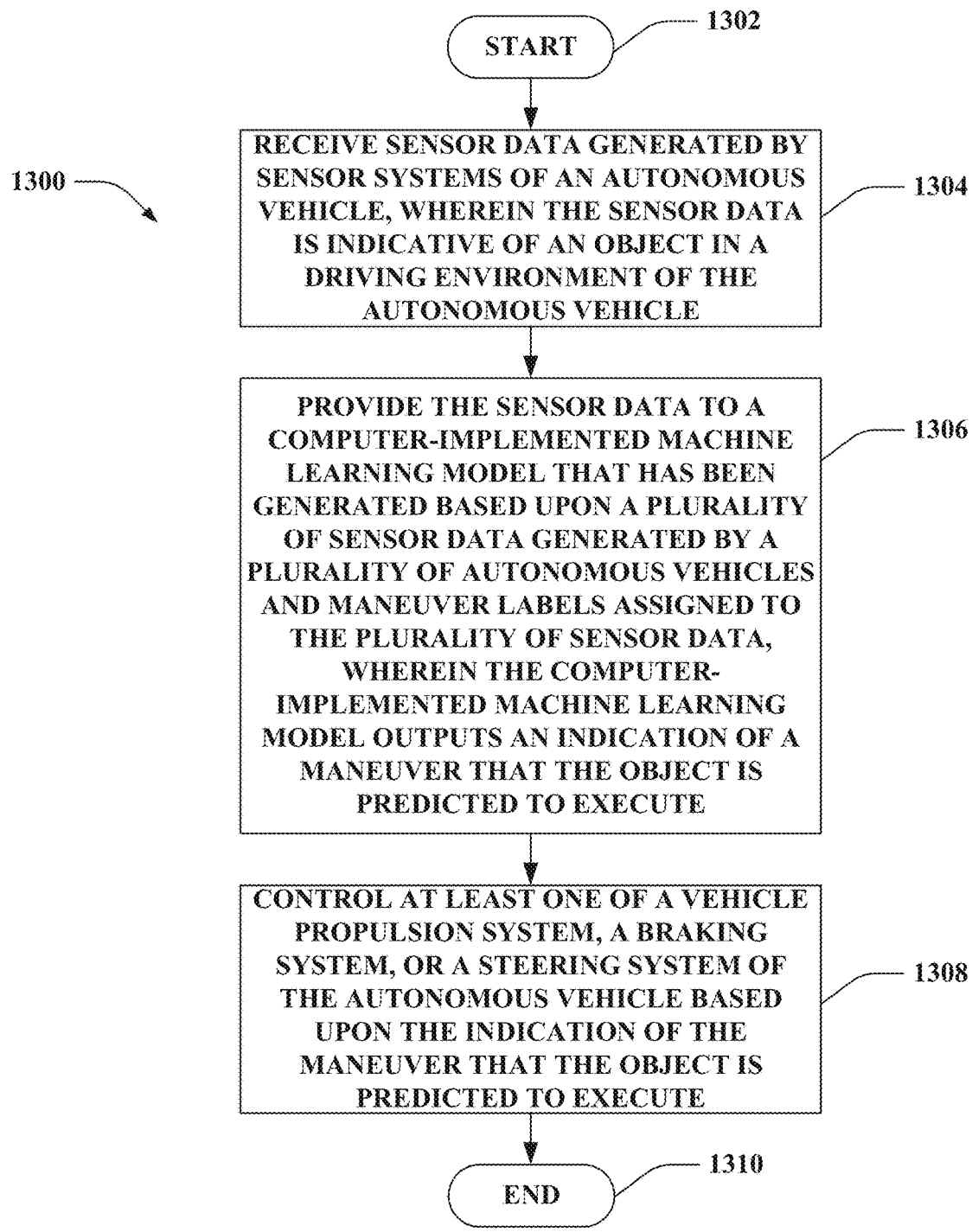
FIG. 13 is a flow diagram that illustrates an exemplary methodology performed by an autonomous vehicle for operating based upon output of a machine learning model.

FIGS. 11-13 illustrate exemplary methodologies relating to assigning maneuver labels to sensor data generated by sensor systems of autonomous vehicles. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference to FIG. 11, a methodology 1100 performed by a computing device for assigning maneuver labels to sensor data generated by an autonomous vehicle is illustrated. The methodology 1100 begins at 1102, and at 1104, the computing device identifies candidate path plans for an object in a driving environment of the autonomous vehicle based upon sensor data generated by sensor systems of the autonomous vehicle. The sensor data is indicative of positions of the object in the driving environment at sequential timesteps in a time period. Each candidate path plan is indicative of a possible maneuver being executed by the object during the time period.

At 1106, the computing device generates a weighted directed graph based upon the candidate path plans. The weighted directed graph comprises nodes and weighted directed edges connecting at least a portion of the nodes. Each node in the nodes is assigned to a candidate path plan in the candidate path plans at a sequential timestep. A weighted directed edge in the weighted directed edges is indicative of a transition relationship between a first candidate path plan in the candidate path plans at a first sequential timestep in the sequential timesteps and a second candidate path plan in the candidate path plans at a second sequential timestep in the sequential timesteps for the object.

At 1108, the computing device determines a shortest path through the weighted directed graph by applying a shortest path algorithm to the weighted directed graph. At 1110, the computing device assigns a maneuver label to the sensor data based upon the shortest path. The maneuver label is indicative of a maneuver the object executes during the time period. At 1112, the computing device performs an operation based upon the maneuver label and the sensor data. The methodology 1100 concludes at 1114.

Turning to FIG. 12, a methodology 1200 performed by a computing device for generating a computer-implemented machine learning model based upon labeled sensor data is illustrated. The methodology 1200 begins at 1202, and at 1204, the computing device receives labeled sensor data. The labeled sensor data comprises a plurality of sensor data generated by a plurality of sensor systems of a plurality of autonomous vehicles and maneuver labels assigned to the plurality of sensor data. At 1206, the computing device generates the computer-implemented machine learning model based upon the labeled sensor data. The computer-implemented machine learning model takes sensor data generated by sensor systems of an autonomous vehicle as input. The sensor data is indicative of an object in a driving environment of the autonomous vehicle. The computer-implemented machine learning model is configured to output an indication of a maneuver that the object is predicted to execute. The methodology 1200 concludes at 1208.

With reference to FIG. 13, a methodology 1300 performed by an autonomous vehicle for navigating based upon output of a computer-implemented machine learning model is illustrated. The methodology 1300 begins at 1302, and at 1304, the autonomous vehicle receives sensor data generated by sensor systems of the autonomous vehicle. The sensor data is indicative of an object in a driving environment of the autonomous vehicle.

At 1306, the autonomous vehicle provides the sensor data to a computer-implemented machine learning model. The computer-implemented machine learning model has been generated based upon a plurality of sensor data generated by a plurality of autonomous vehicles and maneuver labels that have been assigned to the plurality of sensor data. A computing device has assigned the maneuver labels to the plurality of sensor data by identifying candidate path plans for objects in driving environments of the plurality of autonomous vehicles, generating weighted directed graphs based upon the candidate path plans, and determining shortest paths through the weighted directed graphs. The computer-implemented machine learning model outputs an indication of a maneuver that the object is predicted to execute.

At 1308, the autonomous vehicle controls at least one of a vehicle propulsion system, a braking system, or a steering system of the autonomous vehicle based upon the indication of the maneuver that the object is predicted to execute. The methodology 1300 concludes at 1310.

Figure 14:
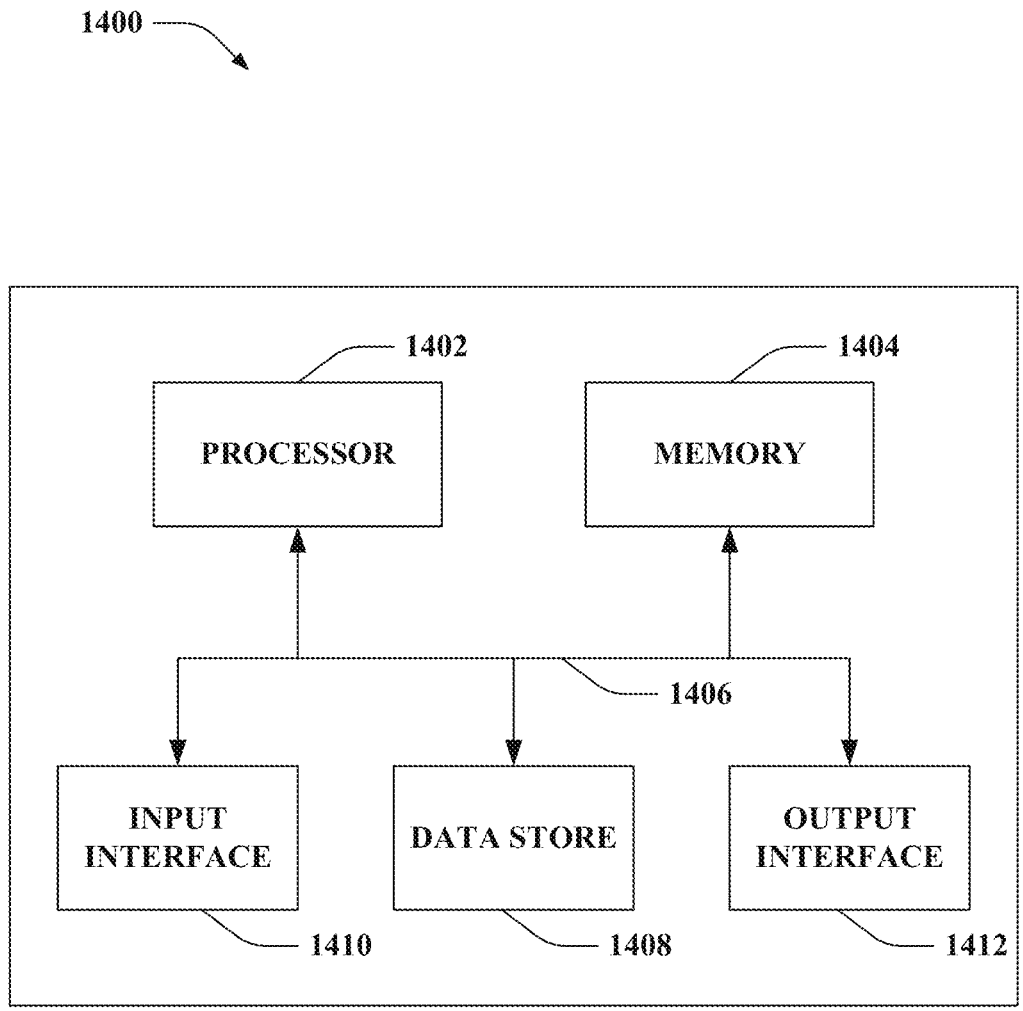
FIG. 14 illustrates an exemplary computing device.

Referring now to FIG. 14, a high-level illustration of an exemplary computing device 1400 that can be used in accordance with the systems and methodologies disclosed herein is illustrated. For instance, the computing device 1400 may be or include the computing device 100 or the computing system 412. The computing device 1400 includes at least one processor 1402 that executes instructions that are stored in a memory 1404. The instructions may be, for instance, instructions for implementing functionality described as being carried out by one or more systems discussed above or instructions for implementing one or more of the methods described above. The processor 1402 may be a graphics processing unit (GPU), a plurality of GPUs, a central processing unit (CPU), a plurality of CPUs, a multi-core processor, etc. The processor 1402 may access the memory 1404 by way of a system bus 1406. In addition to storing executable instructions, the memory 1404 may also store computer-implemented machine learning models, sensor data, labeled sensor data, mapping data, weighted directed graphs, and so forth.

The computing device 1400 additionally includes a data store 1408 that is accessible by the processor 1402 by way of the system bus 1406. The data store 1208 may include executable instructions, computer-implemented machine learning models, sensor data, labeled sensor data, mapping data, weighted directed graphs, etc. The computing device 1400 also includes an input interface 1410 that allows external devices to communicate with the computing device 1400. For instance, the input interface 1410 may be used to receive instructions from an external computer device, etc. The computing device 1400 also includes an output interface 1412 that interfaces the computing device 1400 with one or more external devices. For example, the computing device 1400 may transmit control signals to the vehicle propulsion system 406, the braking system 408, and/or the steering system 410 by way of the output interface 1412.

Additionally, while illustrated as a single system, it is to be understood that the computing device 1400 may be a distributed system. Thus, for instance, several devices may be in communication by way of a network connection and may collectively perform tasks described as being performed by the computing device 1400.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing device comprises:
   a processor; and
   memory that stores computer-readable instructions that, when executed by the processor, cause the processor to perform acts comprising:
      identifying candidate path plans for an object in a driving environment of an autonomous vehicle based upon sensor data generated by sensor systems of the autonomous vehicle, wherein the sensor data is indicative of positions of the object in the driving environment at sequential timesteps in a time period, wherein each candidate path plan in the candidate path plans is indicative of a possible maneuver being executed by the object during the time period;
      generating a weighted directed graph based upon the candidate path plans, wherein the weighted directed graph comprises nodes and weighted directed edges connecting at least a portion of the nodes, wherein each node in the nodes is assigned to a candidate path plan in the candidate path plans at a sequential timestep in the sequential timesteps, wherein a weighted directed edge in the weighted directed edges is indicative of a transition relationship between a first candidate path plan in the candidate path plans at a first sequential timestep in the sequential timesteps and a second candidate path plan in the candidate path plans at a second sequential timestep in the sequential timesteps for the object;
      determining a shortest path through the weighted directed graph;
      assigning a maneuver label to the sensor data based upon the shortest path, wherein the maneuver label is indicative of a maneuver that the object executes during the time period; and
      generating a computer-implemented machine learning model based in part upon the sensor data and the maneuver label assigned to the sensor data, wherein the computer-implemented machine learning model is configured to predict a second maneuver that a second object in a second driving environment of a second autonomous vehicle is to execute based upon second sensor data generated by second sensor systems of the second autonomous vehicle.

2. The computing device of claim 1, wherein the maneuver label is one of:
   straight;
   left lane change;
   right lane change;
   left turn;
   right turn;
   stationary; or
   unknown.

3. The computing device of claim 1, wherein the computer-implemented machine learning model is one of:
   an artificial neural network (ANN);
   a deep neural network (DNN);
   a recurrent neural network (RNN);
   a decision tree;
   a random forest;
   a support vector machine (SVM); or
   a convolutional neural network (CNN).

4. The computing device of claim 1, wherein the computer-implemented machine learning model generates a probability distribution over second possible maneuvers executed by the second object, wherein the second maneuver is included in the second possible maneuvers.

5. The computing device of claim 1, wherein the object is one of:
   a vehicle;
   a bicycle; or
   a pedestrian.

6. The computing device of claim 1, wherein identifying the candidate path plans comprises executing a search over mapping data retained in a data store of the autonomous vehicle, wherein the mapping data comprises path plans for the driving environment, wherein the search produces search results including the candidate path plans.

7. The computing device of claim 1, wherein the sensor data is at least one of radar sensor data, lidar sensor data, or camera sensor data.

8. The computing device of claim 1, wherein the time period ranges from 1 to 6 seconds, wherein the sequential timesteps occur every 0.05 to 0.2 seconds within the time period.

9. A method executed by a processor of a server computing device, the method comprising:
   identifying candidate path plans for an object in a driving environment of an autonomous vehicle based upon sensor data generated by sensor systems of the autonomous vehicle, wherein the sensor data is indicative of positions of the object in the driving environment at sequential timesteps in a time period, wherein each candidate path plan in the candidate path plans is indicative of a possible maneuver being executed by the object during the time period;

generating a weighted directed graph based upon the candidate path plans, wherein the weighted directed graph comprises nodes and weighted directed edges connecting at least a portion of the nodes, wherein each node in the nodes is assigned to a candidate path plan in the candidate path plans at a sequential timestep in the sequential timesteps, wherein a weighted directed edge in the weighted directed edges is indicative of a transition relationship between a first candidate path plan in the candidate path plans at a first sequential timestep in the sequential timesteps and a second candidate path plan in the candidate path plans at a second sequential timestep in the sequential timesteps for the object;

determining a shortest path through the weighted directed graph by applying a shortest path algorithm to the weighted directed graph;

assigning a maneuver label to the sensor data based upon the shortest path, wherein the maneuver label is indicative of a maneuver that the object executes during the time period; and generating a computer-implemented machine learning model based in part upon the sensor data and the maneuver label assigned to the sensor data, wherein the computer-implemented machine learning model is configured to predict a second maneuver that a second object in the driving environment of the autonomous vehicle is to execute based upon second sensor data generated by the sensor systems of the autonomous vehicle.

10. The method of claim 9, further comprising:
prior to identifying the candidate path plans, receiving the sensor data from the autonomous vehicle via a network.

11. The method of claim 9, wherein first nodes in the nodes are assigned to a first subset of candidate path plans in the candidate path plans at the first sequential timestep in the sequential timesteps, wherein second nodes in the nodes are assigned to a second subset of candidate path plans in the candidate path plans at the second sequential timestep in the sequential timesteps, wherein a subset of weighted directed edges in the weighted directed edges connect at least some of the first nodes to at least some of the second nodes.

12. The method of claim 9, wherein the shortest path algorithm is one of a Dijkstra's algorithm, a Bellman-Ford algorithm, or a Floyd-Warshall algorithm.

13. The autonomous vehicle of claim 9, wherein the computer-implemented machine learning model generates a probability distribution over possible maneuvers that can be executed by the second object, wherein the second maneuver is included in the second possible maneuvers.

14. An autonomous vehicle comprising:
sensor systems;
a vehicle propulsion system;
a braking system;
a steering system; and
a computing system that is in communication with the sensor systems, the vehicle propulsion system, the braking system, and the steering system, wherein the computing system comprises:
a processor; and
memory that stores computer-readable instructions that, when executed by the processor, cause the processor to perform acts comprising:

receiving sensor data generated by the sensor systems, wherein the sensor data is indicative of an object in a driving environment of the autonomous vehicle;

providing the sensor data as input to a computer-implemented machine learning model, wherein the computer-implemented machine learning model has been generated based upon a plurality of sensor data generated by a plurality of autonomous vehicles and maneuver labels assigned to the plurality of sensor data, wherein a computing device has assigned the maneuver labels to the plurality of sensor data by:

identifying candidate path plans for objects in driving environments of the plurality of autonomous vehicles;

generating weighted directed graphs based upon the candidate path plans, wherein each of the weighted directed graphs comprises nodes and weighted directed edges connecting at least a portion of the nodes, wherein each node in the nodes is representative of a candidate path plan in the candidate path plans, and wherein a weighted directed edge in the weighted directed edges is indicative of a transition relationship between a first candidate path plan in the candidate path plans at a first sequential timestep and a second candidate path plan in the candidate path plans at a second sequential timestep;

determining shortest paths through the weighted directed graphs; and assigning the maneuver labels based upon the shortest paths;

wherein the computer-implemented machine learning model outputs an indication of a maneuver that the object is predicted to execute; and controlling at least one of the vehicle propulsion system, the braking system, or the steering system based upon the indication of the maneuver that the object is predicted to execute.

15. The autonomous vehicle of claim 14, wherein the sensor data includes at least one of radar sensor data, lidar sensor data, or camera sensor data.

16. The autonomous vehicle of claim 14, wherein the object is predicted to execute the maneuver within a time period that extends 6 to 10 seconds from a time at which the computing system receives the sensor data.

17. The autonomous vehicle of claim 14, wherein controlling at least one of the vehicle propulsion system, the braking system, or the steering system based upon the indication of the maneuver that the object is predicted to execute comprises:

controlling at least one of the vehicle propulsion system, the braking system, or the steering system to execute a second maneuver.

18. The autonomous vehicle of claim 17, wherein the second maneuver is one of:

maintaining a straight heading;

a left lane change;

a right lane change;

a left turn;

a right turn; or remaining stationary.

19. The autonomous vehicle of claim 14, wherein the object is one of:
  a vehicle;
  a bicycle; or
  a pedestrian.

20. The autonomous vehicle of claim 14, wherein the indication of the maneuver that the object is predicted to execute comprises a probability distribution over possible maneuvers that can be executed by the object, wherein the maneuver that the object is predicted to execute is included in the possible maneuvers.

* * * * *